UNITED STATES PATENT OFFICE.

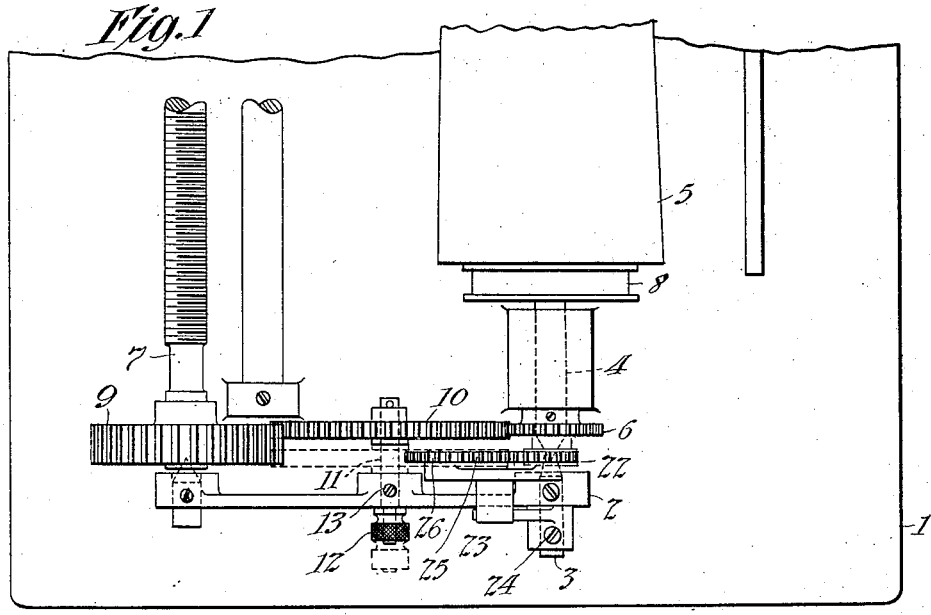
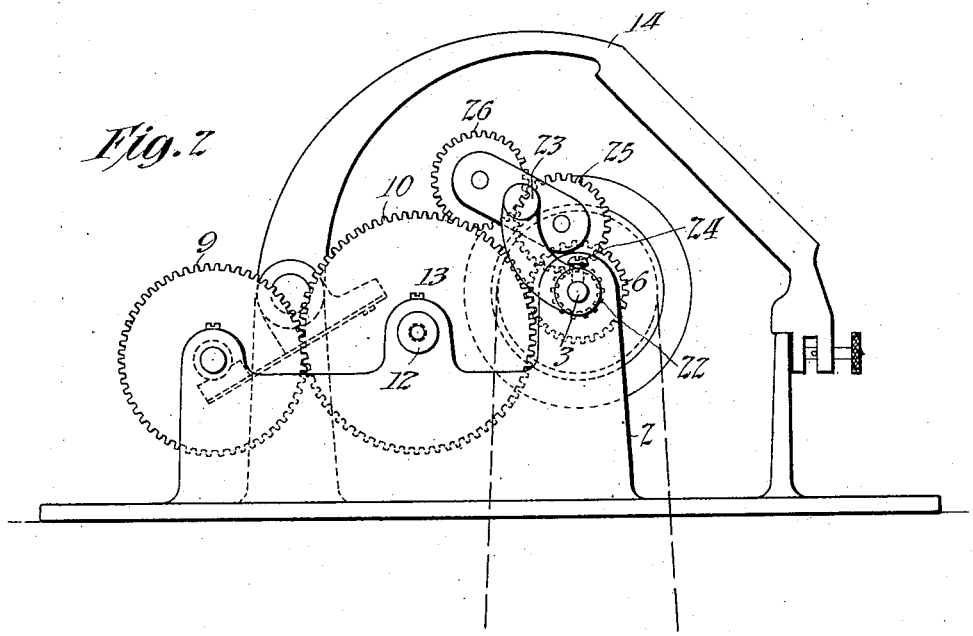

PETER WEBER, OF ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH.

932,200.

Specification of Letters Patent.  Patented Aug. 24, 1909.

Application filed January 20, 1908. Serial No. 411,829.

*To all whom it may concern:*

Be it known that I, PETER WEBER, a citizen of the United States, and a resident of Orange, in the county of Essex and State of New Jersey, have made certain new and useful Improvements in Phonographs, of which the following is a description.

My invention relates to a phonograph having interchangeable means for changing the relative speed of the feed screw with respect to the mandrel in a definite ratio so as to adapt the phonograph, when provided with the ordinary sound box carrier driven from the feed screw in the usual manner, to operate upon phonograph sound records having either one hundred or two hundred threads to the inch, or sound records bearing any other definite relation to each other as regards the pitch thereof.

It comprises improved means for gearing together the mandrel and feed screw shaft, so that the relative speeds thereof may be varied by a very simple change of gearing, the change gearing being added to the frame of an existing phonograph adapted to operate upon records having one hundred threads to the inch or any other single definite gear ratio between the mandrel and the feed screw shaft, the frame and other existing elements of the existing machine being changed by my invention as little as possible.

The invention consists of the features hereinafter set forth and claimed.

Reference is hereby made to the accompanying drawings of which—

Figure 1 is a plan view of a phonograph of well-known form to which my invention is applied and Fig. 2 is an end elevation of the same.

Corresponding parts are designated by the same reference numerals in both views.

The phonograph shown comprises a base or body 1, formed with an upright 2 upon which is rotatably supported the shaft 4 carrying the mandrel 5, to which is secured a drive pulley 8 adapted to receive the belt from the phonograph motor. The feed screw shaft 7 is also rotatably supported and is provided with a spur gear 9 fixed thereto and formed with gear teeth of considerable width, as shown. A spur gear 10 is rotatably mounted upon a longitudinally movable pin 11, said pin being provided with a head 12, and being supported in an opening formed in the upright 2, in which it may be secured by a set screw 13. A pair of spur gears 6 and 22 are fixed to the mandrel shaft 4, and there is a frame or support 23 which carries a pair of rotatable spur gears 25 and 26 which mesh with each other, and the former of which meshes with the gear 22. The frame 23 is preferably sleeved upon the projecting end of the pivot pin or center 3 which supports the end of the shaft 4, and said frame is fixed to said pin in any suitable manner, as by set screw 24.

When the parts are in the positions shown in full lines, Fig. 1, the feed screw shaft 7 is driven from the mandrel shaft 4 through the gears 6, 10 and 9, and these gears are so proportioned that the speed of the feed screw shaft will be suitable for feeding the sound box carriage 14 at a suitable speed for operating upon sound records having one hundred threads to the inch. Upon loosening the set screw 13, the pin 11 carrying the gear 10 may be moved from the position shown in full lines, Fig. 1, to the position shown in dotted lines, in which position the gear 10 will remain in engagement with the gear 9, but will be brought out of engagement with the gear 6 and into engagement with the gear 26, and the feed screw shaft will then be driven from the mandrel shaft through the gears 22, 25, 26, 10 and 9, and these gears are so proportioned that the speed imparted to the feed screw shaft will be suitable for operatively feeding the carriage 14 with respect to a sound record having two hundred threads to the inch. The pin 11 may be held in this position by the set screw 13.

It will be noted that the frame of the existing phonograph is made use of unchanged, except that the prolonged sliding stud 11 carrying sliding intermediate gear 10 is made use of in place of the short fixed stud carrying the intermediate gear in the usual 100 thread machine. Also, the wide toothed gear 9 of the feed screw shaft is substituted for the narrow gear usual in the ordinary construction, and the prolonged center 3 for the mandrel shaft 4 is substituted for the ordinary short center usual in this location. Also, two gears 6 and 22 are placed on the mandrel shaft instead of the usual single gear. On the prolongation of the center 3 the frame carrying the gears 25 and 26 is sleeved, as above described.

Having now described my invention, what I claim is:

1. In a phonograph, the combination with the rotary mandrel and feed screw shafts, of an upright carrying centers supporting one end of each of the same, a wide toothed gear fixed to one of said shafts, a pair of gears fixed to the other of said shafts, a stud extending through said upright and slidable therein, a gear thereon meshing with said wide toothed gear and movable into and out of driving relation to each of said fixed gears while remaining in mesh with said wide toothed gear, substantially as described.

2. In a phonograph, the combination with the rotary mandrel and feed screw shafts, of an upright carrying centers supporting one end of each of the same, a wide toothed gear fixed to one of said shafts, a pair of gears fixed to the other of said shafts, a stud extending through said upright and slidable therein, the center for supporting the end of the shaft carrying the pair of fixed gears being prolonged beyond the upright, a support attached to the prolongation thereof, a gear train carried thereby meshing with one of said fixed gears, and a gear on said slidable stud meshing continuously with said wide toothed gear and interchangeably with the other of said fixed gears and with the gear train, substantially as described.

3. In a phonograph, the combination with the rotary mandrel and feed screw shafts, of an upright carrying centers supporting one end of each of the same, a wide toothed gear fixed to one of said shafts, a pair of gears fixed to the other of said shafts, a stud extending through said upright and slidable therein, the center for supporting the end of the shaft carrying the pair of fixed gears being prolonged beyond the upright, a support sleeved to the prolongation thereof, a gear train carried thereby meshing with one of said fixed gears, and a gear on said slidable stud meshing continuously with said wide toothed gear and interchangeably with the other of said fixed gears and with the gear train, and means for securing the slidable stud and the sleeved support in any desired position, substantially as described.

This specification signed and witnessed this 13 day of Jan. 1908.

PETER WEBER.

Witnesses:
FRANK D. LEWIS.
H. H. DYKE.